United States Patent [19]

Nakajima

[11] Patent Number: 5,393,005
[45] Date of Patent: Feb. 28, 1995

[54] BRAKE STRUCTURE FOR A REEL

[75] Inventor: Hideki Nakajima, Sakai, Japan

[73] Assignee: Shimano Inc., Osaka, Japan

[21] Appl. No.: 893,004

[22] Filed: Jun. 3, 1993

[30] Foreign Application Priority Data

Jun. 19, 1991 [JP] Japan .................. 3-46172[U]

[51] Int. Cl.⁶ .................................. A01K 89/033
[52] U.S. Cl. ..................... 242/289; 188/184
[58] Field of Search ............ 242/289, 312; 182/234, 182/239; 188/78, 135, 184, 185; 192/105 BA

[56] References Cited

U.S. PATENT DOCUMENTS

| | | | |
|---|---|---|---|
| 2,482,863 | 9/1949 | Nelson | 242/289 |
| 2,489,447 | 11/1949 | Borgstrom | 242/289 |
| 2,808,905 | 10/1957 | Bohl | 188/184 |
| 2,967,676 | 1/1961 | Klingberg | 242/289 |
| 3,986,678 | 10/1976 | Coquelet et al. | 242/289 |
| 4,119,188 | 10/1978 | Argereu | 188/185 X |
| 4,601,438 | 7/1986 | Young | 242/289 |

FOREIGN PATENT DOCUMENTS

| | | | |
|---|---|---|---|
| 55-2782 | 1/1980 | Japan . | |
| 64075 | 8/1949 | Netherlands | 188/185 |

*Primary Examiner*—Daniel P. Stodola
*Assistant Examiner*—Michael R. Mansen
*Attorney, Agent, or Firm*—Dickstein, Shapiro & Morin

[57] ABSTRACT

A brake structure for a reel comprising a rotary member rotatable in a spool transmission system, a centrifugal brake device including a brake block radially slidably mounted on the rotary member and a brake shoe attached to a fixing structure, and a position maintaining mechanism for allowing slide movement of the brake block to maintain the brake block in an operative position for effecting a braking operation and a retaining position for moving the brake block away from the brake shoe. The brake block is reversibly moved from the operative position to the retaining position upon release of the positional maintenance.

14 Claims, 4 Drawing Sheets

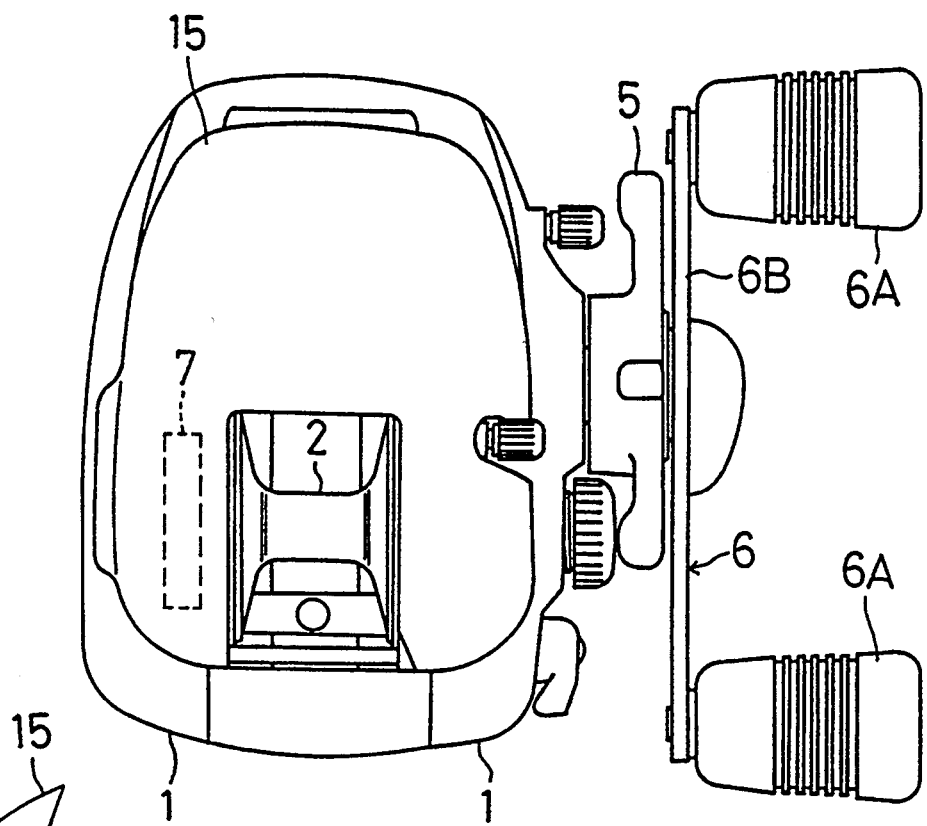
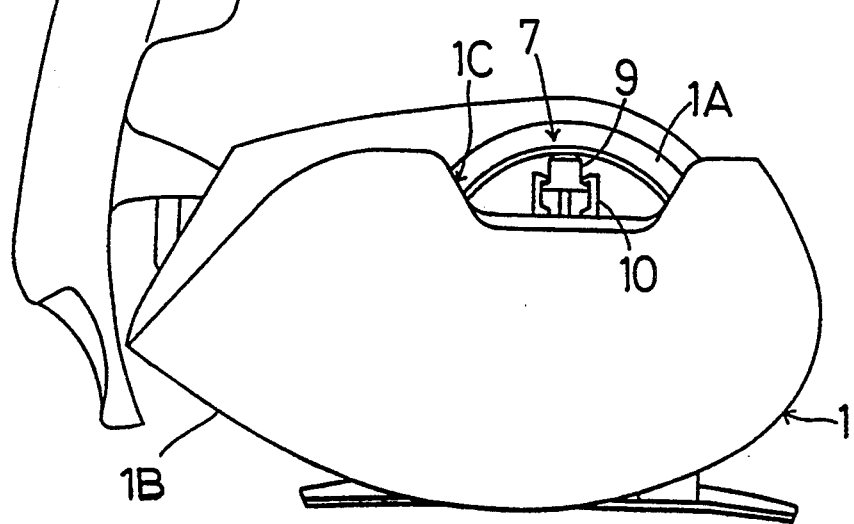

BRAKE STRUCTURE FOR A REEL

BACKGROUND OF THE INVENTION

1. Field of the Invention

The present invention relates to a brake structure for a reel, and more particularly to a brake structure comprising a rotary member rotatable in a spool transmission system, a brake block slidably and radially mounted on the rotary member, and a brake shoe attached to a fixing structure, said brake block and brake shoe constituting a centrifugal brake device.

2. Description of the Related Art

The conventional brake blocks in general act on the brake shoe upon rotation of the rotary member.

However, even when only free rotation of the spool is required to be inspected, the centrifugal brake device is disadvantageously operated. Apart from such a case, with reels having a plurality of centrifugal brakes for exchanging one brake block for any other brake block of different weight in order to adjust the braking force according to a diameter of a fishing line or mass of a weight, it is difficult to find any suitable place to keep the removed brake block. As a result, the detached brake block sometimes tends to be lost.

SUMMARY OF THE INVENTION

A primary object of the present invention is to provide a structure for maintaining the brake block in a retaining position for moving the brake block away from the brake shoe while readily switching the brake block between the retaining position and an operative position.

In order to fulfill the above-noted object, the present invention is characterized by a brake structure comprising a position maintaining mechanism for maintaining the brake block in an operative position for allowing sliding movement of the brake block to effect a braking operation, and in a retaining position for moving the brake block away from the brake shoe, the brake block being reversibly moved from the operative position to the retaining position upon release of the positional maintenance.

This structure has the following functions and effects.

When maintained in the operative position, the brake block acts on the brake shoe under a centrifugal force to produce a braking force corresponding to the applied centrifugal force. On the other hand, when maintained in the retaining position, the brake block does not act on the brake shoe even if the centrifugal force is applied.

Thus, a condition in which the centrifugal force is not applied can be realized without removing the brake block from the position maintaining mechanism to easily and quickly change the position of the brake block. In addition, the braking force can be readily adjusted through a plurality of centrifugal brakes.

BRIEF DESCRIPTION OF THE DRAWINGS

FIG. 4 is a side view of a reel with a cover being opened;

FIG. 5 is a top plan view of the reel;

DETAILED DESCRIPTION OF THE PREFERRED EMBODIMENTS

A brake structure of a reel according to the present invention will be described in detail hereinafter referring to the accompanying drawings.

Figure 1:
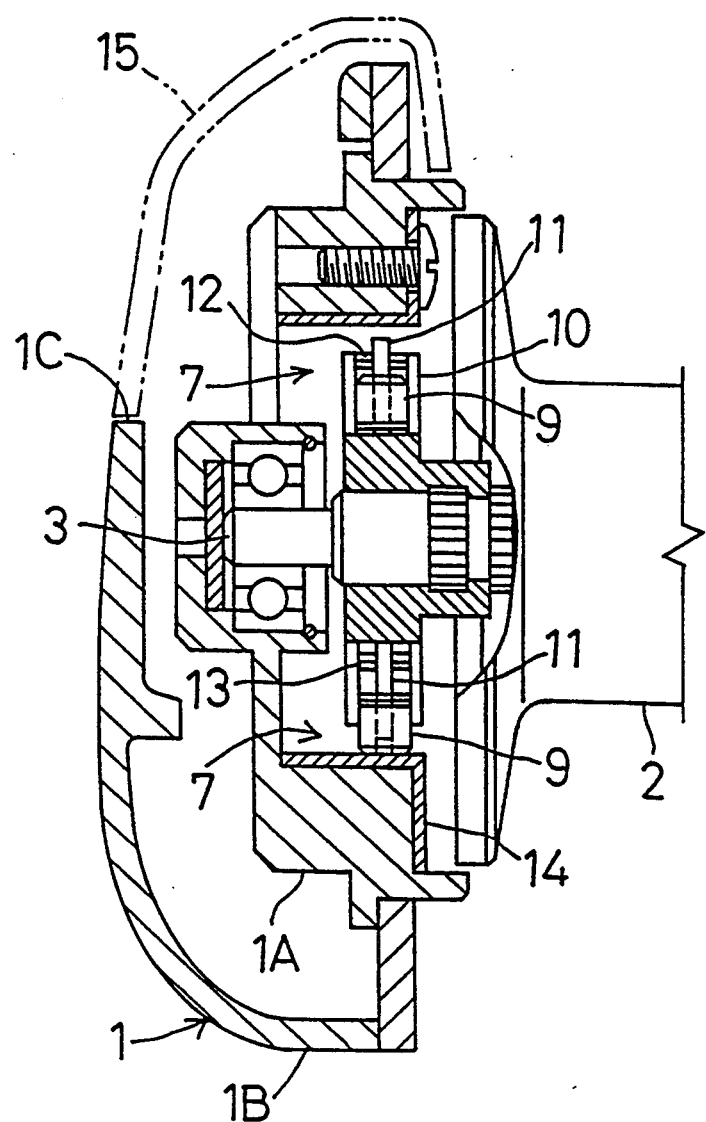
FIG. 1 is a rear view in vertical section showing a centrifugal brake device.
Figure 3:
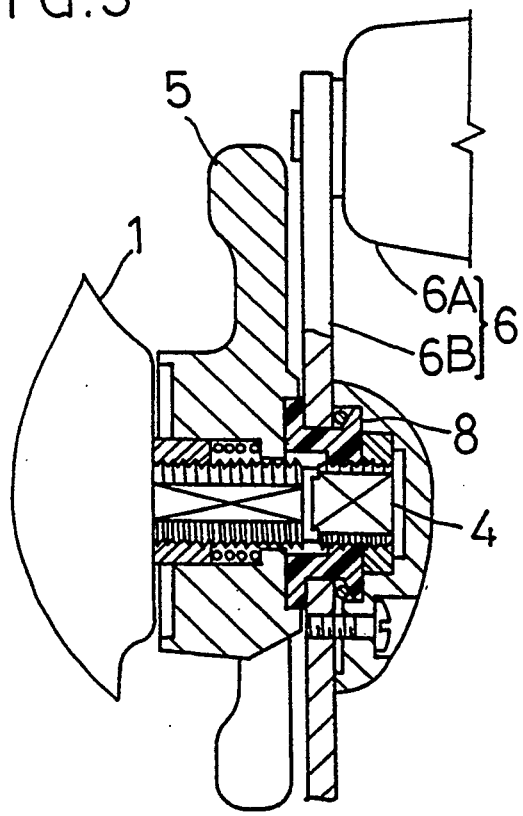
FIG. 3 is a sectional view showing attachment of a handle to a main shaft.

FIGS. 1, 3 and 5 show a baitcasting reel for use in the present invention which comprises right and left side cases 1, a spool 2 mounted between the side cases to be rotatable in unison with a spool shaft 3. A main shaft 4 forming a spool transmission system is supported by the right side case 1. A drag control element 5 and a handle 6 for winding up a fishing line are mounted on the main shaft 4 to rotate the spool 2. A pair of centrifugal brakes 7 for the spool 2 are mounted on the left side case 1.

A mounting structure for the handle 6 will be set forth next. Referring to FIG. 3, the handle 6 includes a grip portion 6A and an arm 6B for supporting the grip portion 6A. The arm 6B is mounted on the main shaft 4. An adapter 8 made of resin is attached to an end portion of the main shaft 4. The arm 6B is mounted on an outer periphery of the resin adapter 8, thereby to avoid direct contact between the main shaft 4 and the arm 6B to prevent corrosion due to a local cell resulting from direct contact between the aluminum arm 6B and the brass main shaft 4.

Figure 2:
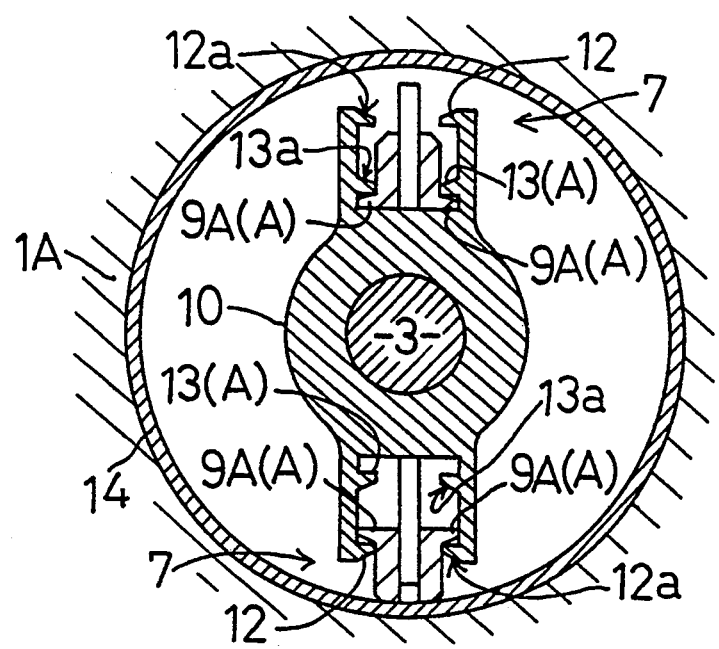
FIG. 2 is a side view in vertical section showing the relationship between a brake block and a brake shoe of the centrifugal brake device.

The centrifugal brake device 7 will be described below. As shown in FIG. 1, an end portion of the spool shaft 3 is positioned in a recess defined between an inner peripheral wall 1A of the left side case 1 and the spool 2. A holder 10 acting as a rotary member for housing a brake block 9 is mounted on and rotatable in unison with the end portion of the spool shaft 3. Referring to FIG. 2, each end portion of the holder 10 extending radially of the spool shaft 3 defines a space for housing the brake block 9. Within this space is radially mounted a support shaft 11. The brake block, 9 is slidably attached to the support shaft 11. First projections 12 project inwardly from opposite inner lateral walls of the holder 10 at an opening end portion of the housing space. The first projections 12 are elastically deformable. The brake block 9 is depressed under an elastic deforming force to be placed in the housing space. The brake block 9 defines flange pieces 9A at one end thereof. The brake block 9 contacts the first projections 12 and the flange pieces 9A thereby to prevent the brake block 9 from falling off the housing space.

Second projections 13 having the similar structure to the first projections 12 project inwardly from the opposite inner lateral walls of the holder at an inner portion of the housing space opposite to the opening end portion. The brake block 9 is deeply depressed under a deforming elastic force to be maintained at an inner position.

With this structure, the brake block 9 is moved inwardly from the second projections to be fixedly placed in that position. When the brake block 9 is pulled out of the position against the elastic force of the second projections 13 to be positioned between the second projections 13 and the first projections 12, the brake block 9 can be slidably movable along an axis of the support shaft 11. One side face of the first projection 12 and of the second projection 13 may be defined as an inclined face 12a or 13a. Such a structure allows the operator to easily depress the brake block 9, and at the same time the brake block 9 does not tend to fall off the projections once depressed.

Referring to FIGS. 1 and 2, a brake shoe 14 having an L-shape in section is attached to the inner wall 1A of the left case 1 outwardly of the holder 10. The brake shoe forms a centrifugal brake device 7 operable in cooperation with the brake block 9 pressed to the brake shoe 14 under the centrifugal force. The centrifugal brake device 7 includes a pair of brakes mounted on the holder 10.

The second projections 13 and the flange pieces 9A of the brake block 9 are referred to as a position maintaining mechanism A for maintaining the brake block 9 at a retaining position spaced apart from the brake shoe 14. When an operational force greater than the centrifugal force is forcibly applied to move the brake block 9, the brake block 9 is moved to an operative position to be slidable under the centrifugal force.

Referring to FIG. 4, a large cutout 1C is defined in an outer peripheral wall 1B and the inner peripheral wall 1A of the left case 1 such that the brake block 9 is operable with a cover 15 being lifted, thereby to be readily moved from the retaining position to the operative position.

Other modifications will be set forth below.

Figure 6:
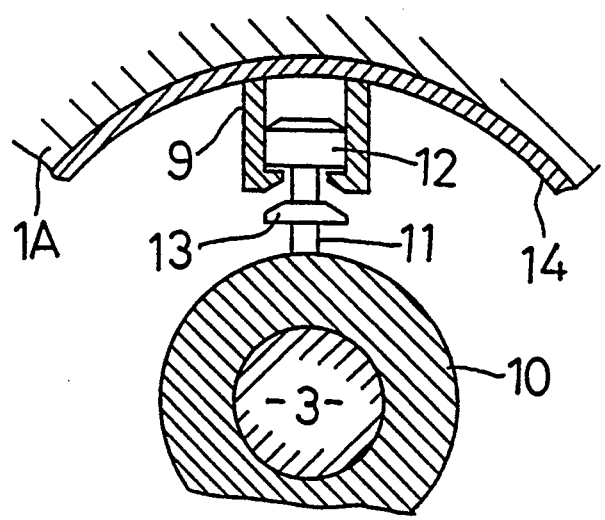
FIG. 6 is a side view in vertical section showing another embodiment of the structure for maintaining the brake block of the centrifugal brake device.
Figure 7:
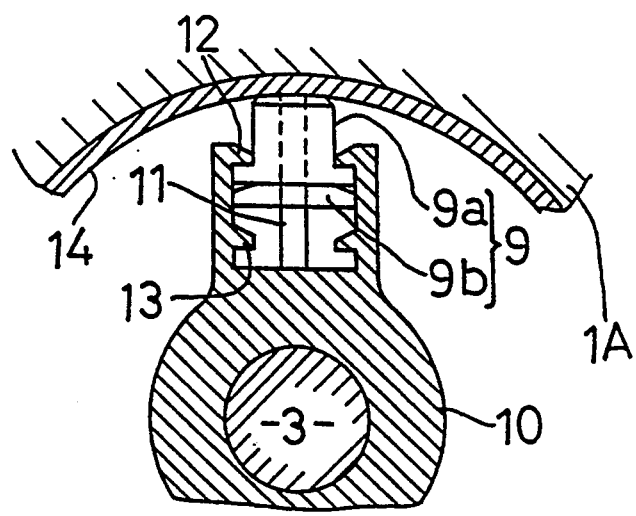
FIG. 7 is a side view in vertical section showing a a further embodiment of the brake block of the centrifugal brake device.

1) The brake block 9 may be mounted on the housing space without being attached to the support shaft 11.
2) The flange pieces 9A of the brake block 9 acting as the position maintaining mechanism A may be elastically deformable.
3) In order to apply the operational force to move the brake block 9 from the retaining position to the operative position, a compact solenoid or the like may be provided.
4) As shown in FIG. 6, the support shaft 11 may be uprightly mounted on a boss acting as the rotary member 10, and the first projections 12 and the second projections 13 may be defined in the support shaft 11 for maintaining the brake block 9 in the retaining position and the operative position.
5) As shown in FIG. 7, the brake block 9 may include a bullet-like block 9a and a plate-like block 9b. The plate-like block 9b, solely or integrally with the bullet-like block 9b, may be movable between the operative position and the retaining position, thereby to allow the braking force to vary.
6) More than three spaces for housing the brake block 9 may be defined in the holder 10, and a number of centrifugal brakes 7 may be provided. With this structure, the respective centrifugal brakes 7 are individually moved between the operative position and the retaining position to allow the brake force to vary in multiple stages.
7) In order to maintain the brake block 9 in the retaining position, the support shaft 11 may define an engaging bore to fix the brake block 9 to the support shaft 11 by means of a pin extending through the brake block 9 and the engaging bore.
8) in order to maintain the brake block 9 in the retaining position, the brake block 9 may be screwed to support shaft 11.

What is claimed is:

1. A fishing reel comprising:
   a reel body, a spool, and a spool shaft;
   a centrifugal brake including a plurality of brake blocks and a brake shoe, each of said brake blocks having a flange piece, said brake shoe being attached to said reel body;
   a rotary member mounted on said spool shaft, said rotary member being rotatable with said spool, each of said brake blocks being slidably mounted on a respective support shaft, said support shaft extending radially outwardly relative to said rotary member; and
   a position maintaining mechanism including:
     a first position maintaining member rotatable with said rotary member and engageable with a first one of said flange pieces for maintaining a respective one of said brake blocks in an operative position, said first brake block being freely contactable with said brake shoe and being in slidable contact with a respective one of said support shafts when said first brake block is in said operative position, and
     a second position maintaining member formed integrally with said first position maintaining member and engageable with said flange piece of said first brake block for maintaining said brake block in an inoperative position where said first brake block is prevented from contacting said brake shoe,
     said brake blocks being individually switchable between said operative position and said inoperative position.

2. A fishing reel as claimed in claim 1, wherein said first position maintaining member is formed integrally with said rotary member.

3. A fishing reel as claimed in claim 2, wherein said reel body has a left case having an inner peripheral wall, and wherein a recess is defined between said spool and said inner peripheral wall, and wherein said spool shaft includes an end portion, said end portion being located within said recess, and wherein said rotary member includes a holder for housing said brake blocks, said holder being attached to said end portion of said spool shaft and being rotatable therewith.

4. A fishing reel as claimed in claim 3, wherein said holder defines a plurality of housing spaces for housing said brake blocks, and wherein said support shafts are located within a corresponding one of said housing spaces.

5. A fishing reel as claimed in claim 4, wherein said first position maintaining member has a first projection located within a corresponding one of said housing spaces.

6. A fishing reel as claimed in claim 5, wherein said second position maintaining member has a second projection located within a corresponding one of said housing spaces.

7. A fishing reel as claimed in claim 1, wherein said reel body has a left case having an inner peripheral wall, and wherein said brake shoe is an annular member having an outer peripheral flange disposed outwardly of said rotary member, said flange being attached to said inner peripheral wall.

8. A fishing reel as claimed in claim 1, wherein said rotary member includes a boss attached to said spool shaft.

9. A fishing reel as claimed in claim 1, wherein each one of said brake blocks includes a bullet-like block (9a) and a plate-like block (9b), said bullet-like and plate-like blocks being independently movable with respect to each other between said operative and inoperative positions.

10. A fishing reel as claimed in claim 1, wherein said flange piece is elastic.

11. A fishing reel comprising:

a reel body, a spool, and a spool shaft;

a centrifugal brake including a plurality of brake blocks and a brake shoe, each of said brake blocks having a flange piece, said brake shoe being attached to said reel body;

a rotary member mounted on said spool shaft, said rotary member being rotatable with said spool, and wherein a plurality of housing spaces are defined in said rotary member, said brake blocks having at least a portion thereof located within said housing spaces, and wherein said rotary member includes support shafts for slidably supporting said brake blocks, said support shafts extending radially outwardly from said spool shaft, said support shafts being located within a corresponding one of said housing spaces; and a plurality of position maintaining mechanisms including:

a first position maintaining member rotatable with said rotary member and engageable with said flange pieces for maintaining a respective one of said brake blocks in an operative position, each of said brake blocks being freely contactable with said brake shoe and being in slidable contact with said support shaft when said brake block is in said operative position, and a second position maintaining member formed integrally with said first position maintaining member and engageable with said flange pieces of said brake blocks for maintaining a respective one of said brake blocks in an inoperative position where said brake block is prevented from contacting said brake shoe, said brake blocks being individually switchable between said operative position and said inoperative position.

12. A fishing reel as claimed in claim 11, wherein said flange piece is elastic.

13. A fishing reel comprising:

a reel body having a first case and a second case;

a handle shaft attached to said second case;

a handle mounted on said handle shaft;

a spool rotatable with said spool shaft;

a centrifugal brake including a plurality of brake blocks and a brake shoe, each of said brake blocks having a flange piece, said brake shoe being attached to said first case;

a rotary member mounted on said spool shaft at a position adjacent said first case, said rotary member being rotatable with said spool, each of said brake blocks being slidably mounted on a corresponding support shaft extending radially relative to said rotary member; and a position maintaining mechanism including:

a first position maintaining member rotatable with said rotary member and engageable with a first one of said flange pieces for maintaining a respective first one of said brake blocks in an operative position, said first brake block being freely contactable with said brake shoe and being in slidable contact with a respective first one of said support shafts when said first brake block is in said operative position, and a second position maintaining member formed integrally with said first position maintaining member and engageable with said flange piece of said first brake block for maintaining said first brake block in an inoperative position where said first brake block is prevented from contacting said brake shoe, said brake blocks being individually switchable between said operative position and said inoperative position.

14. A fishing reel as claimed in claim 13, wherein said flange piece is elastic.

* * * * *